Patented Aug. 29, 1944

2,357,089

UNITED STATES PATENT OFFICE 2,357,089

PRODUCTION OF IMPROVED PIGMENTS

William Hammett Daiger, Linthicum Heights, and George Reel Seidel, Baltimore, Md., assignors to E. I. du Pont de Nemours & Company, Wilmington, Del., a corporation of Delaware No Drawing. Application May 10, 1941, Serial No. 392,942

7 Claims. (Cl. 106—300)

This invention relates to the manufacture of improved pigments. More particularly it relates to an improved method for the surface treatment of pigments to improve their durability, particularly when used in oleoresinous paint compositions.

The treatment of pigments with alkali metal silicates is well known in the art and these silicate reagents are quite useful in the preparation of a finely ground pigment. They act as dispersing agents and allow the manufacturer to hydroseparate for the return of coarse particles to the grinding mill for further subdivision. The hydroseparated dispersed slurry is then flocculated by means of a flocculating agent such as magnesium sulfate, calcium chloride or sulfuric acid, after which the pigment is recovered and dried. Pigments produced in this manner will contain minor amounts of either silica or an insoluble silicate, depending on the flocculating agents selected.

The treatment of pigments with larger amounts of silica and silicates has been found useful for certain purposes, particularly for improving hiding power, as demonstrated by their use in flat paints. Further advantages are improvements in gloss retention and chalking.

The usual method for the production of these silicate treated pigments has been to treat the pigment with a silicate, such as the metasilicate, followed by treatment with a solution of a polyvalent metal salt. The two are added separately to the pigment suspension where they react in equivalent proportions to give a metal silicate and a salt solution. The reverse method of addition has also been used and the selection has depended upon the corrosion resistance of the equipment being used or upon the preliminary processing being practiced.

This invention has as an object the production of improved pigments. A further object is a process for the manufacture of pigments which show improved chalking resistance, gloss retention properties and hiding power. A still further object is a method for the production of titanium pigments coated with a fourth group metal silicate. A still further object is the production of silicate treated titanium pigments which do not exhibit thixotropic filter cakes during the processing operation. Additional objects will become apparent from an examination of the following description and claims.

These objects are attained according to the herein described invention which broadly comprises the precipitation of a metal silicate by mixing an acidic solution of a compound of a fourth group metal with an alkali metal silicate in the presence of a suspended pigment.

In a more restricted embodiment this invention comprises mixing a solution of a compound of a fourth group metal with a solution of a soluble silicate in the presence of an aqueous suspension of a pigment, the potential acidity of said metal solution exceeding the potential alkalinity of said silicate solution.

A preferred embodiment of my invention comprises mixing an inorganic acid solution of a fourth group metal, preferably the sulfates and chlorides thereof, with a solution of a soluble silicate in the presence of an aqueous suspension of a titanium pigment, the potential acidity of said metal solution exceeding the potential alkalinity of said silicate solution.

In practicing our invention the amount of silicate and the amount of fourth group metal which may be employed varies within rather wide limits. However, we have found it desirable that the amount of silicate used to be in an amount not exceeding about 5 parts, preferably 2 parts, by weight of SiO$_2$ per 100 parts of pigment. Also, we have found it desirable that the amount of fourth group metal used be in an amount not exceeding about 5 parts, preferably 2 parts, calculated as the oxide, per 100 parts by weight of the pigment.

We have found it highly desirable in the silicate treatment of pigments, particularly titanium pigments, that the potential acidity of the solution of the fourth group metal compound shall exceed the potential alkalinity of the silicate solution used in the precipitation. This condition may be met in several ways, as for instance, by selecting a sodium silicate containing a Na$_2$O:SiO$_2$ ratio less than 1:1, or by selecting an amount of silicate insufficient to completely neutralize the latent or potential acidity of the fourth group metal salt solution.

It is often advantageous to select a solution of a fourth group metal, for instance titanium sulfate, which contains more acid than corresponds to the formula TiOSO$_4$, and react this with the silicate, for instance sodium silicate. In this manner it is very easy to meet the conditions of our process by using amounts of the reagents such that the resulting treated pigment suspension remains acidic as determined by pH or titration measurements. We find it desirable in most instances to first add the fourth group metal salt to the pigment suspension, and follow it with a sodium silicate solution, discontinuing the addition of the latter while the solution remains substantially acid, and preferably below the pH value of 4.0. It is also possible in the practice of our invention to simultaneously add the two reactant solutions to an aqueous titanium pigment suspension using amounts of the reagents, such that the potential acidity of the metal salt solution is greater than the potential alkalinity of the silicate solution.

This invention may be more readily understood from an examination of the following examples which are given for purposes of illustration and are not intended to place any restrictions or limitations on the herein described invention.

Example I 100 parts of calcined titanium dioxide was suspended in 400 parts of water. A solution of titanium sulfate bearing 1.5 mols of $H_2SO_4$ per mol of $TiO_2$ was then added in an amount sufficient to contain 1.0 part $TiO_2$ as the soluble sulfate. The suspension was then thoroughly agitated to obtain uniformity and a sodium silicate solution containing 8.9% $Na_2O$ and 28.7% $SiO_2$ was added in amount sufficient to yield .75 parts $SiO_2$. The suspension remained acid throughout and actual measurements showed the acidity to be below 1.5 pH. The resulting pigment was agitated for a short length of time followed by neutralization to pH 8, after which it was filtered, washed and dried. During filtration the pigment cake remained firm and showed no thixotropic tendencies.

Example II 100 parts of calcined titanium dioxide pigment was slurried in 400 parts of water after which was added enough $Ti(SO_4)_2$ solution to provide 2.0 parts of $TiO_2$. A solution of sodium metasilicate was prepared by dissolving the commercial product in water and the resulting solution was added in an amount equivalent to 1.0 parts by weight of $SiO_2$. The resulting mixture was thoroughly stirred and pH measurements showed it to be below 4.0 throughout the precipitation of the silicate. The suspension was adjusted to pH 8.0 after which it was washed and dried.

Example III

A suspension of finely ground pigment $TiO_2$ was prepared, containing 400 parts of water for each 100 parts of $TiO_2$. The resulting pigment slurry was treated by adding a solution containing 2 parts of dissolved $TiO_2$ in the form of a titanium sulfate solution bearing 2.5 mols of $H_2SO_4$ for each mol of $TiO_2$. The resulting suspension was quite acid and after thorough mixing 5 parts of $SiO_2$ were added as a commercial sodium silicate solution. This commercial product analyzed 8.9% $Na_2O$ and 28.7% $SiO_2$. The solution was thoroughly agitated and the pH was found to be about 3.2. It was then adjusted to 8.5 with ammonium hydroxide, after which the suspension was washed, filtered and the filter cake dried. The filter cake during filtration operation remained firm and showed a complete absence of thixotropic conditions.

Example IV

The process of Example I was repeated using the same proportion of materials but the method of addition was different. The pigment slurry, the titanium sulfate solution, and the sodium silicate solution were simultaneously added to a small reaction tank which overflowed continuously. The overflow was adjusted to pH 8 with ammonium hydroxide and the product finished as in Example I. The properties of the pigment were found to be substantially the same as when the operation was conducted in the batch manner.

Example V

The process of Example II was repeated, except that the two reactants were simultaneously added to a large batch of titanium dioxide pigment slurry. The character of the pigment filter cake and particularly its absence of thixotropic properties indicated that the same results were obtained as when stepwise addition was practiced.

It is to be understood that the herein described specific embodiment of this invention may be subjected to variation and modification without departing from the spirit and scope thereof.

Thus, although the above examples are directed to the treatment of titanium dioxide pigments it is to be understood that this invention is not limited thereto but is applicable to the similar processing of other pigments including extenders such as titanates, zinc sulfide, lithopone, barium sulfate, calcium sulfate, calcium sulfite, calcium carbonate, ultramarine blue, chrome yellow, chrome red, chrome orange, iron blue, etc., as well as admixtures thereof.

We find it convenient to use inorganic acid solutions of fourth group metals in the practice of our novel process although it is to be understood that we are not limited to such inorganic acid solutions. Sulfates and chlorides are particularly useful and we find these compounds of titanium, zirconium, tin, lead, and cerium are especially desirable. These fourth group metals exist as tetravalent salts and one may choose compounds which contain either one or two sulfate radicals per metal atom (e. g., $TiOSO_4$ or $Ti(SO_4)_2$). Even though these more basic compounds are available we prefer to use a fourth group metal compound solution containing a greater amount of the acid radical than corresponds to two hydrogen equivalents per atom of the fourth group metal. Thus, when using titanium sulfate we prefer to use a solution more acidic than corresponds to titanyl sulfate. The same applies to compounds of the other fourth group metals.

Sodium metasilicate is available as an anhydrous material and this is readily dissolved in water to give relatively pure silicate solutions. This reagent has been used in the past for interaction with polyvalent metal salts and the reaction can be shown as follows:

$$ZrOSO_4 + Na_2SiO_3 = ZrSiO_4 + Na_2SO_4$$

This reaction shows the two reagents added in equal molecular proportions, and this does not require substantial acidity adjustments subsequently since one of the solutions contains a potential acidity equal to the potential alkalinity of the other. The term "potential acidity" is defined herein as referring to the extent of acidity that would exist if the fourth group metal were not present in the solution. Likewise, the term "potential alkalinity" is defined herein as caustic content of the soluble silicate and is equal to the alkalinity existing in an alkali metal hydroxide of similar concentration but in the absence of the silica.

The treated pigment suspensions will possess an acidic reaction after mixture of the two reagents. The extent of this acidity is greater than is normally tolerated for finished pigments and accordingly, we practice a neutralization step in which we may add any one of several alkaline neutralizing agents. Ammonium hydroxide, caustic soda, sodium carbonate, lime or barium hydrate, etc., may supply the required alkalinity. The pigment is usually finished within the pH range of 6.5 and 8.0 but this is not considered a requirement of our process and is left to the discretion of the pigment producer.

It is to be understood that the term "acidic solution" as used in the appended claims refers to the reaction of the solution and not to the formula of the compound used in its preparation. An acidic solution as defined herein may be one which contains less acid than corresponds to a normal salt, for example, $Ti(SO_4)_2$.

It is to be noted that acidic solutions of the fourth group metals in general are useful in this invention. We are particularly interested in the treatment of titanium pigments with titanium compounds in conjunction with a soluble silicate, and usually sodium silicate because of its commercial availability.

In the production of silicate treated pigments in accordance with our invention one is able to avoid thixotropic pigment cakes which are undesirable in plant operations due to blinding of filter cloths and decreased production capacity. Our process has further advantages. We find that the products of this invention excel the prior art products in that they show superior chalk resistance and durability. These properties are readily demonstrated by incorporation in ordinary exterior house paint formula.

Pigments produced in accordance with our process have consistently shown improved chalk resistance and durability over those produced by the prior art, namely, those produced in which the fourth group metal compound and the sodium silicate were added in equivalent proportions and under conditions which did not provide an excess of acidity as a result of the reaction. The products of our invention have been found to require a 20–40% greater exposure period before the maximum chalking of the paint film is encountered. This is a definite advantage, particularly in certain exterior formulations, and has been found to exist not only in linseed oil vehicles but also in other coating compositions such as phenol formaldehyde resins, such as are currently used in the paint industry in conjunction with vegetable oils as linseed or China-wood oil.

As many apparently widely different embodiments of this invention may be made without departing from the spirit and scope thereof, it is to be understood that we do not limit ourselves to the specific embodiment except as defined in the appended claims.

Having described the present invention the following is claimed as new and useful:

1. A process for the production of an improved pigment which comprises mixing an acidic solution of a compound of a fourth group metal with an alkali metal silicate solution in the presence of an aqueous suspension of a pigment and utilizing such amount and composition of solution reagents in the mixing operation that the resulting pigment suspension possesses an acidic reaction.

2. An improved process for the production of pigments which comprises mixing a solution of a compound of a fourth group metal containing a greater amount of the acid radical than corresponds to 2 hydrogen equivalents per atom of the fourth group metal with a solution of an alkali metal silicate, in the presence of an aqueous suspension of the pigment, the potential acidity of said metal compound solution exceeding the potential alkalinity of the said silicate solution.

3. A process for the production of improved titanium pigments which comprises mixing a solution of a compound of a fourth group metal containing a greater amount of the acid radical than corresponds to 2 hydrogen equivalents per atom of the fourth group metal with a solution of an alkali metal silicate, in the presence of an aqueous suspension of the pigment, the amount and composition of said reagent solutions being such as to provide substantially acid conditions during the mixing operation.

4. A process for the production of improved titanium pigments which comprises the addition of a solution of a compound of a fourth group metal containing a greater amount of the acid radical than corresponds to 2 hydrogen equivalents per atom of the fourth group metal to an aqueous suspension of the pigment, and thereafter adding an alkali metal silicate solution while providing acid conditions during the mixing operation.

5. A process for the surface treatment of titanium pigments by coating the surface of the particles thereof with a fourth group tetravalent metal silicate which comprises mixing a solution of a fourth group tetravalent metal containing a greater amount of acid radical than corresponds to 2 hydrogen equivalents per atom of the tetravalent metal with a solution of an alkali metal silicate in the presence of said pigment while providing acidic conditions during at least part of said treatment.

6. A process for surface treating pigments to improve the durability characteristics thereof which comprises mixing a solution of titanium sulfate with a solution of an alkali metal silicate in the presence of an aqueous suspension of said pigment, such amounts and concentrations of reagents being used in the mixing operations that the resulting pigment suspension possesses an acidic reaction.

7. A process for surface treating a titanium oxide pigment to improve the durability characteristics thereof and increase its chalk resistance and gloss retention properties, which comprises mixing a titanium sulfate solution with a solution of sodium silicate, effecting said admixture in the presence of an aqueous suspension of previously calcined pigment titanium oxide, and utilizing such amounts and concentrations of reagents in the mixing operation that the resulting pigment suspension possesses an acidic reaction below substantially a pH of 4.0.

WILLIAM HAMMETT DAIGER.
G. R. SEIDEL.